United States Patent [19]
Kiest, Jr.

[11] Patent Number: 6,105,619
[45] Date of Patent: Aug. 22, 2000

[54] APPARATUS FOR REPAIRING A PIPELINE AND METHOD FOR USING SAME

[75] Inventor: Larry W. Kiest, Jr., Ottawa, Ill.

[73] Assignee: LMK Enterprises, Inc., Ottawa, Ill.

[21] Appl. No.: 09/299,486

[22] Filed: Apr. 26, 1999

Related U.S. Application Data

[62] Division of application No. 08/852,590, May 7, 1997, Pat. No. 6,021,815, which is a division of application No. 08/622,817, Mar. 27, 1996, Pat. No. 5,765,597, which is a continuation-in-part of application No. 08/293,697, Aug. 19, 1994, abandoned.

[51] Int. Cl.$^7$ .................................................. F16L 55/16
[52] U.S. Cl. .............................. 138/98; 138/97; 156/287; 264/269; 264/516
[58] Field of Search ................... 138/98, 97; 156/156, 156/94, 294, 297; 264/36, 269, 516, 572, 573

[56] References Cited

U.S. PATENT DOCUMENTS

| | | | |
|---|---|---|---|
| 3,069,093 | 12/1962 | Schultz | 239/215 |
| 3,782,636 | 1/1974 | Donnelly | 239/216 |
| 3,914,825 | 10/1975 | Reynolds | 24/115 R |
| 4,207,130 | 6/1980 | Barber | 156/244.13 |
| 4,350,548 | 9/1982 | Zenbayashi et al. | 156/156 |
| 4,366,012 | 12/1982 | Wood | 156/287 X |
| 4,414,918 | 11/1983 | Holland et al. | 239/222 X |
| 4,685,983 | 8/1987 | Long, Jr. | 156/64 |
| 4,752,511 | 6/1988 | Driver | 428/36 |
| 4,778,553 | 10/1988 | Wood | 156/287 |
| 4,836,715 | 6/1989 | Wood | 138/984 X |
| 5,044,405 | 9/1991 | Driver et al. | 138/98 |
| 5,092,265 | 3/1992 | Hughes et al. | 118/317 |
| 5,280,811 | 1/1994 | Catallo et al. | 138/98 |
| 5,329,063 | 7/1994 | Endoh | 138/98 |
| 5,388,616 | 2/1995 | Muller et al. | 138/98 |
| 5,624,629 | 4/1997 | Wood | 264/516 |
| 5,794,663 | 8/1998 | Keist, Jr. et al. | 138/98 |

FOREIGN PATENT DOCUMENTS

| | | |
|---|---|---|
| 241 719 A1 | 10/1987 | European Pat. Off. . |
| 467 679 A1 | 1/1992 | European Pat. Off. . |
| 518 521 A2 | 12/1992 | European Pat. Off. . |
| 618503 | 6/1976 | U.S.S.R. . |
| WO 93/16320 | 8/1993 | WIPO . |

*Primary Examiner*—Patrick Brinson
*Attorney, Agent, or Firm*—Zarley, McKee, Thomte, Voorhees & Sease

[57] ABSTRACT

A pipe repair apparatus includes an outer carrier tube, an inner bladder tube within the carrier tube, and a repair sleeve within the bladder tube. The bladder tube and the carrier tube are formed by one unitary tube which is folded back upon itself. A wick extends from the repair sleeve to the rear end of the bladder tube and permits evacuation of gases from the bladder tube when the bladder tube is flattened by a vacuum during insertion of a curable resin into the bladder tube at its forward end. The bladder tube can be inverted out of the carrier tube so as to place the repair sleeve in contact with an area to be repaired within a sewer pipe. This method may also be used to repair the damaged joint between a lateral sewer line and a main sewer line.

7 Claims, 8 Drawing Sheets

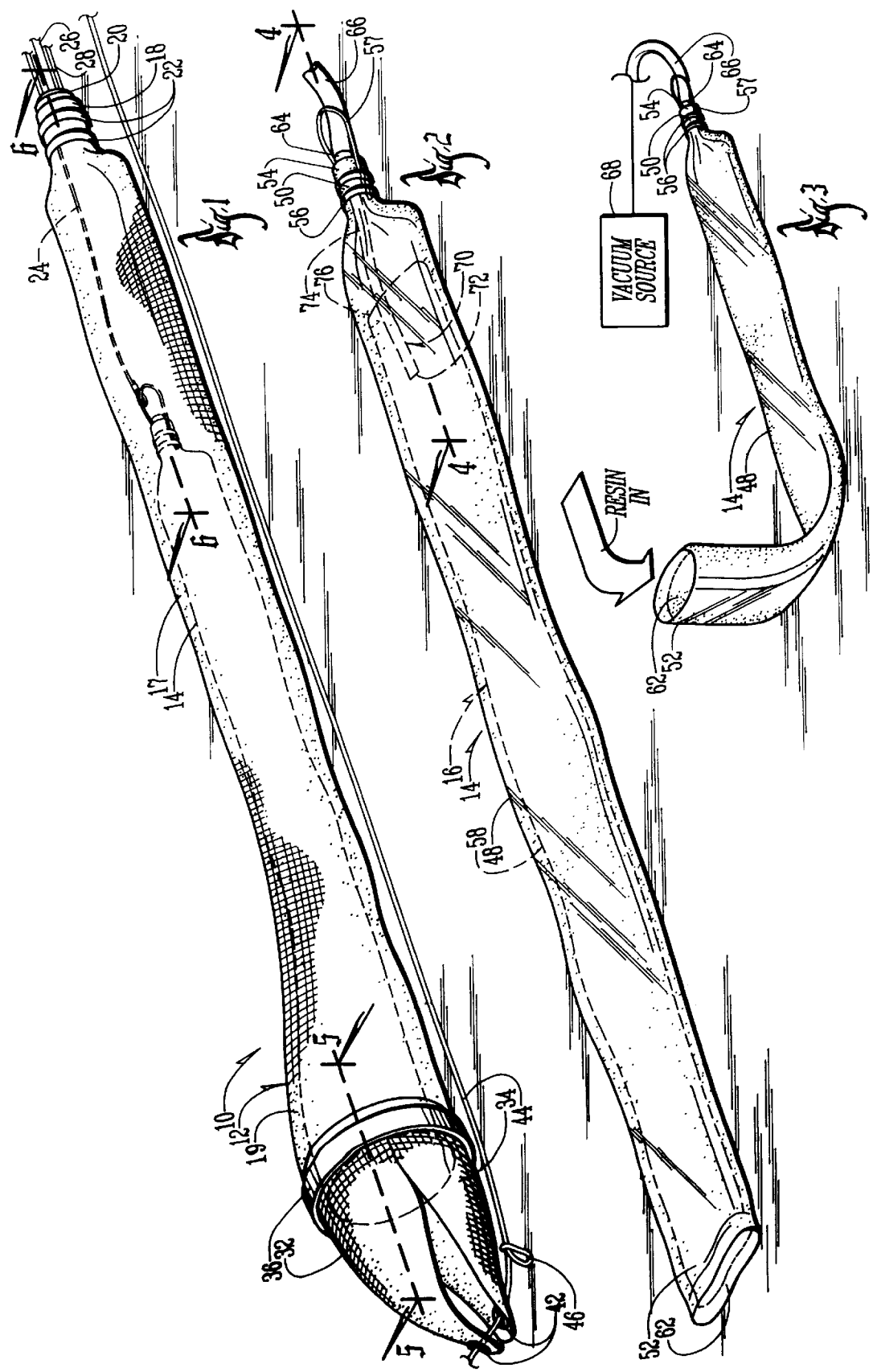

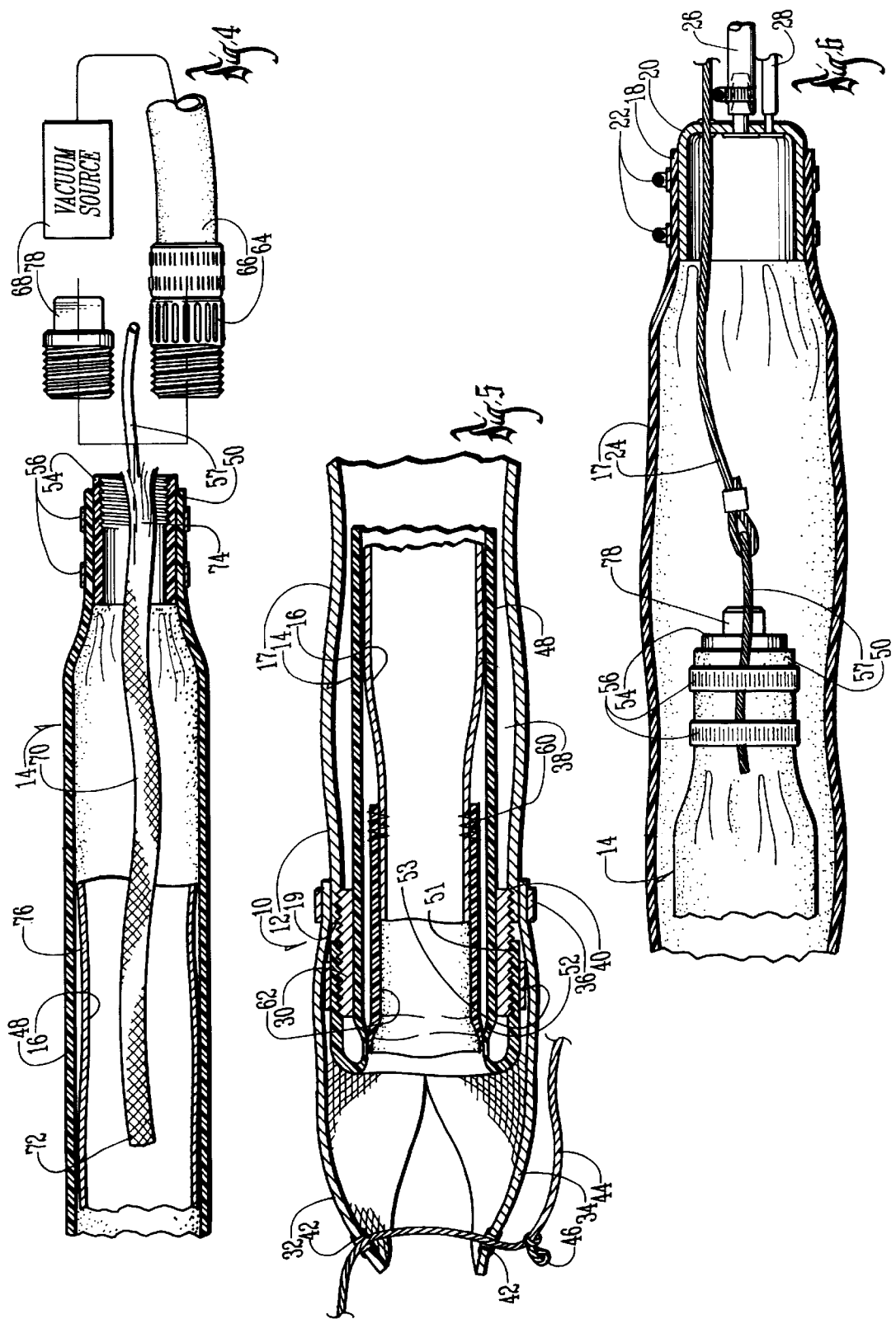

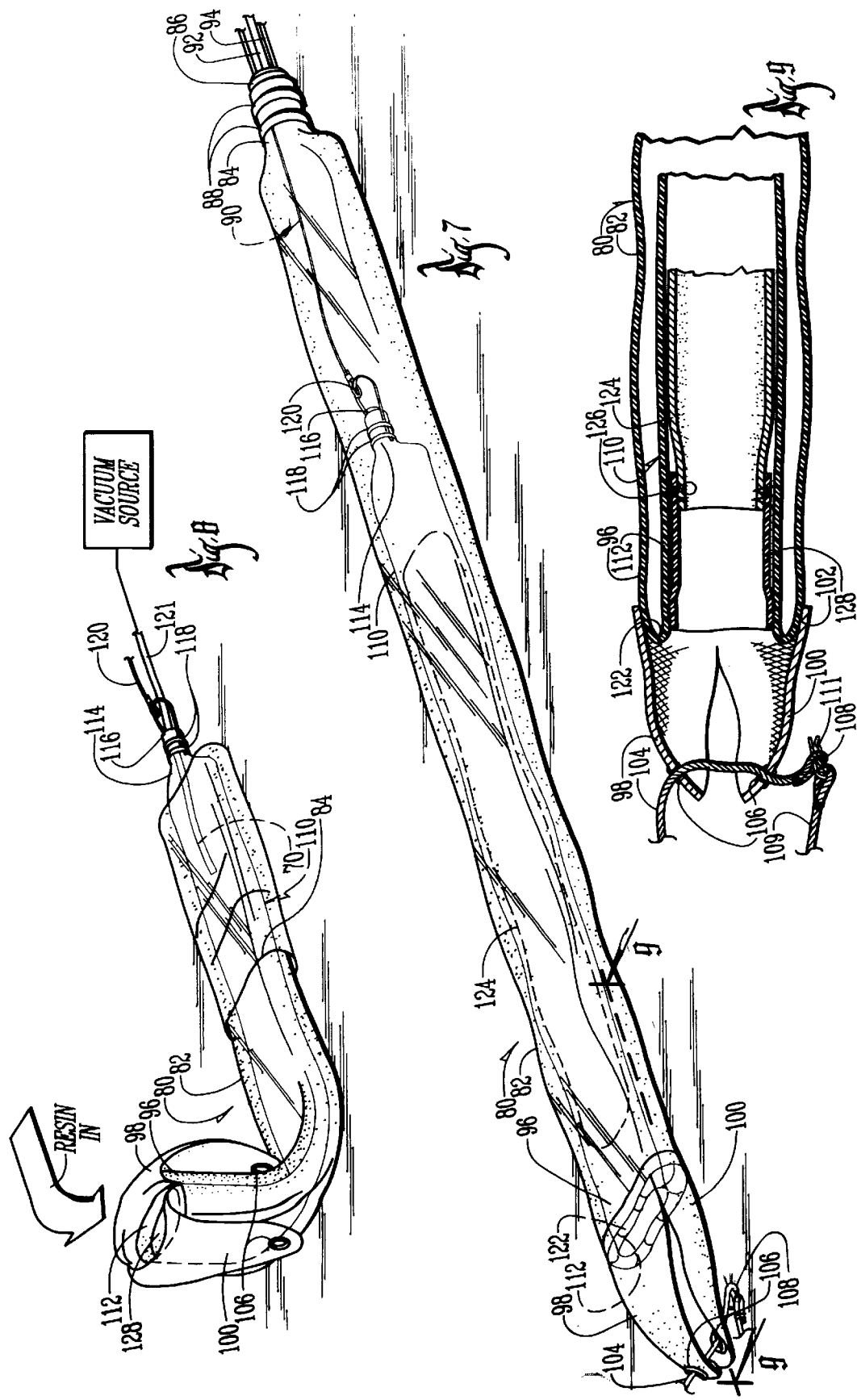

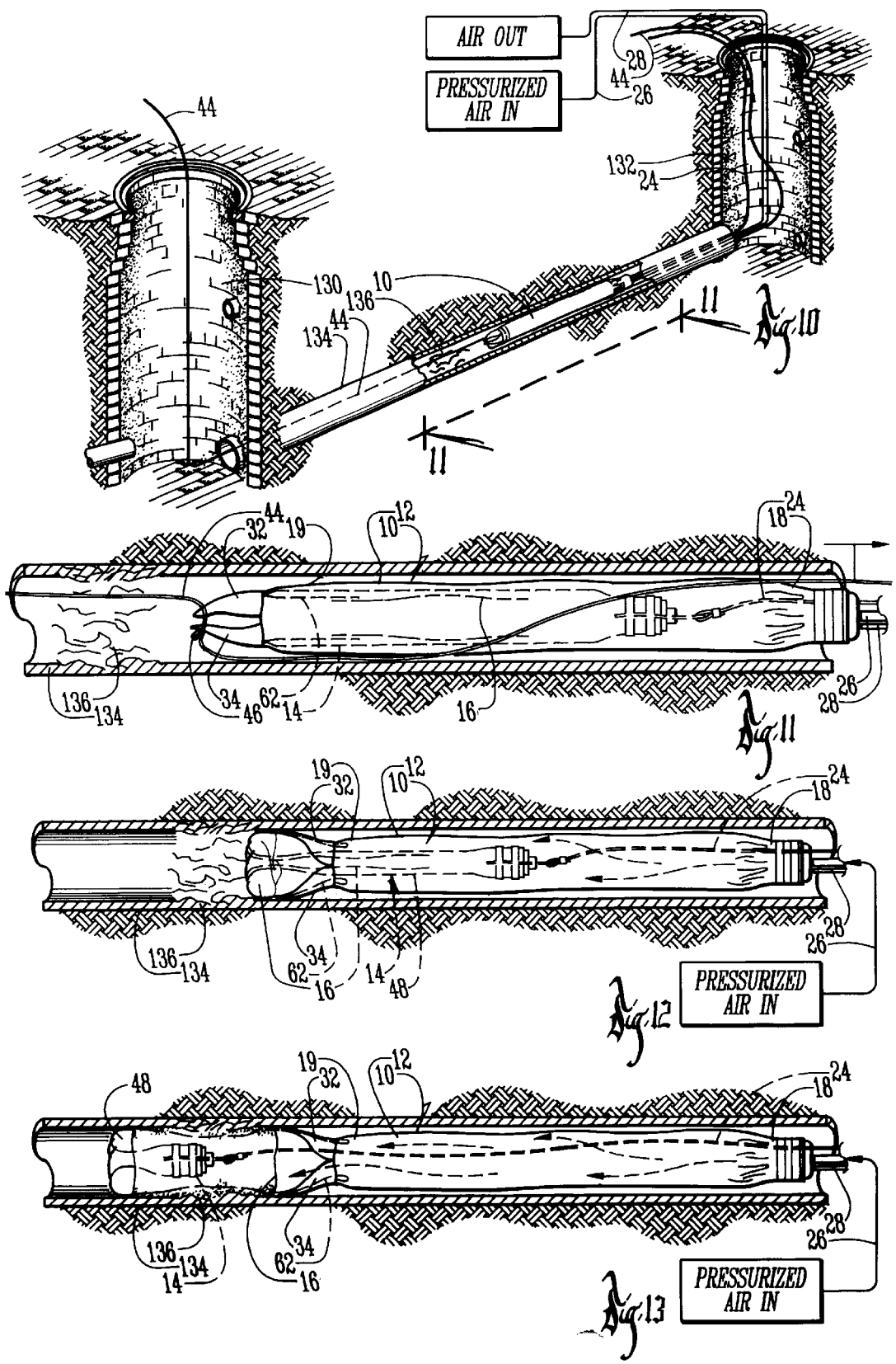

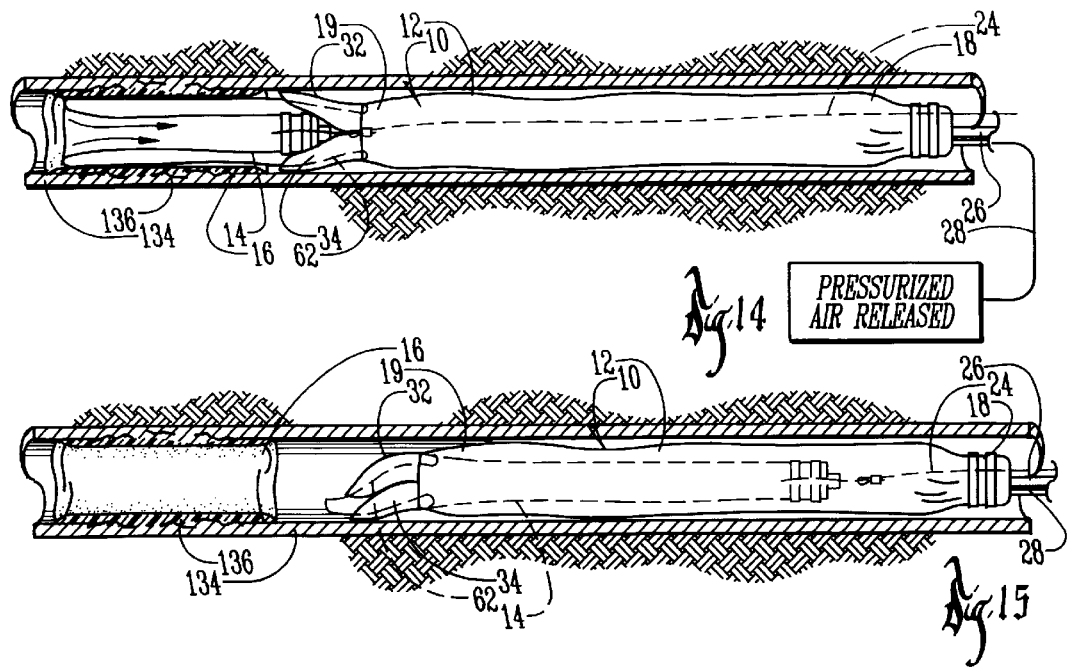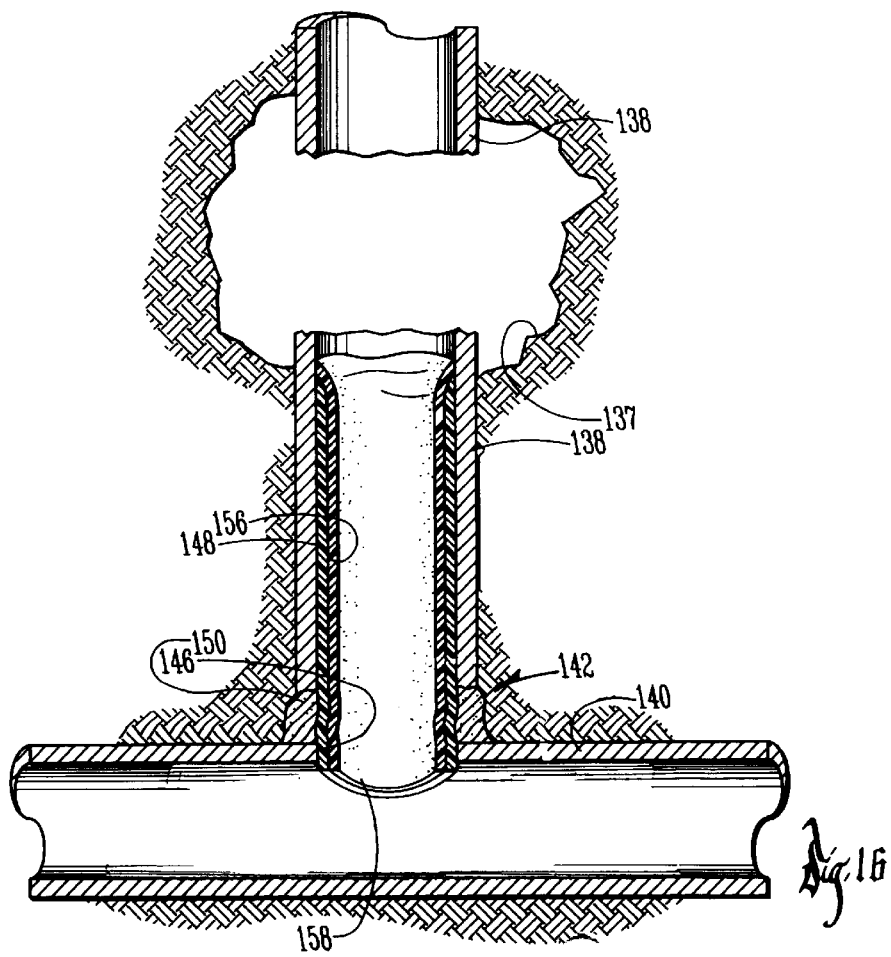

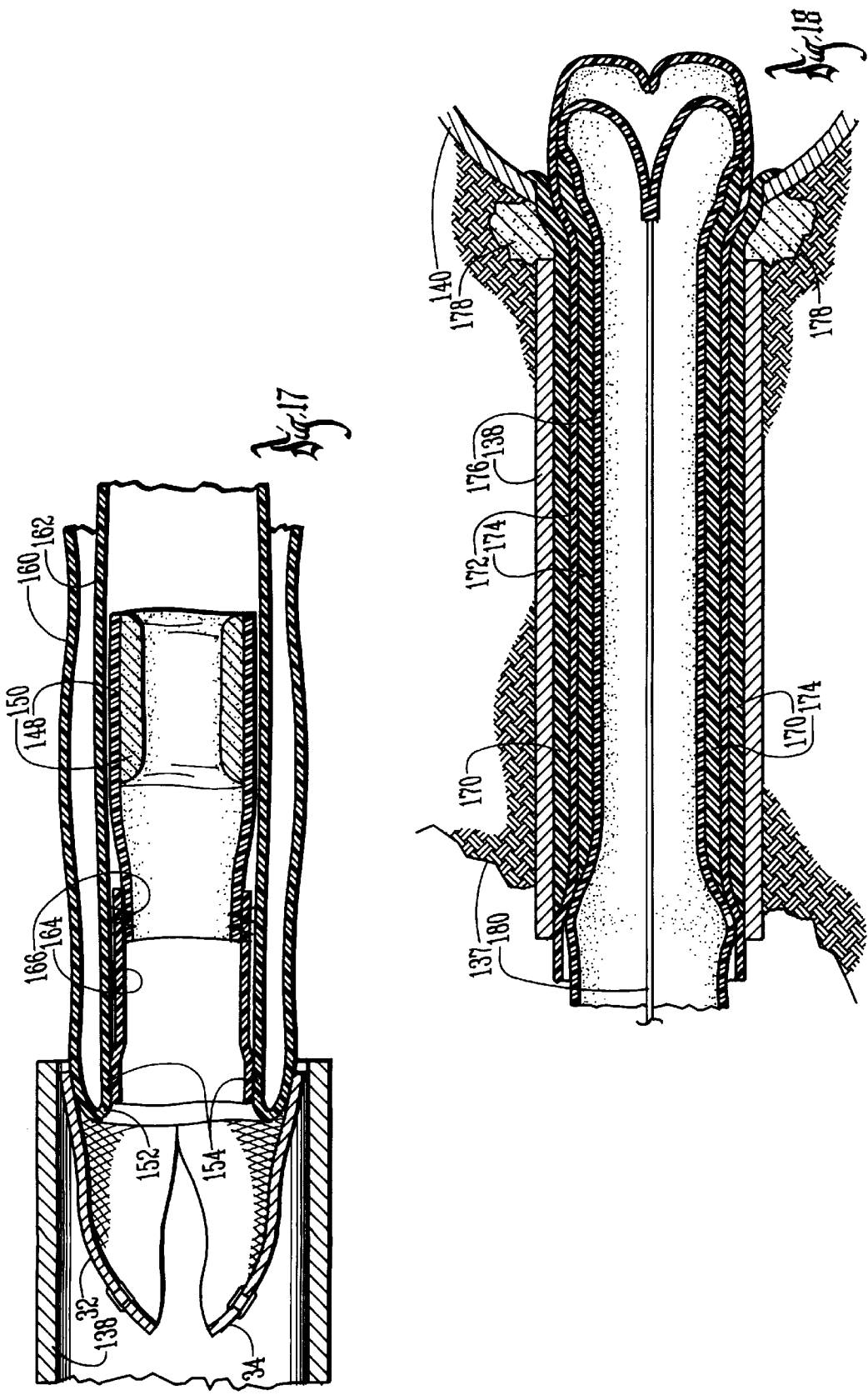

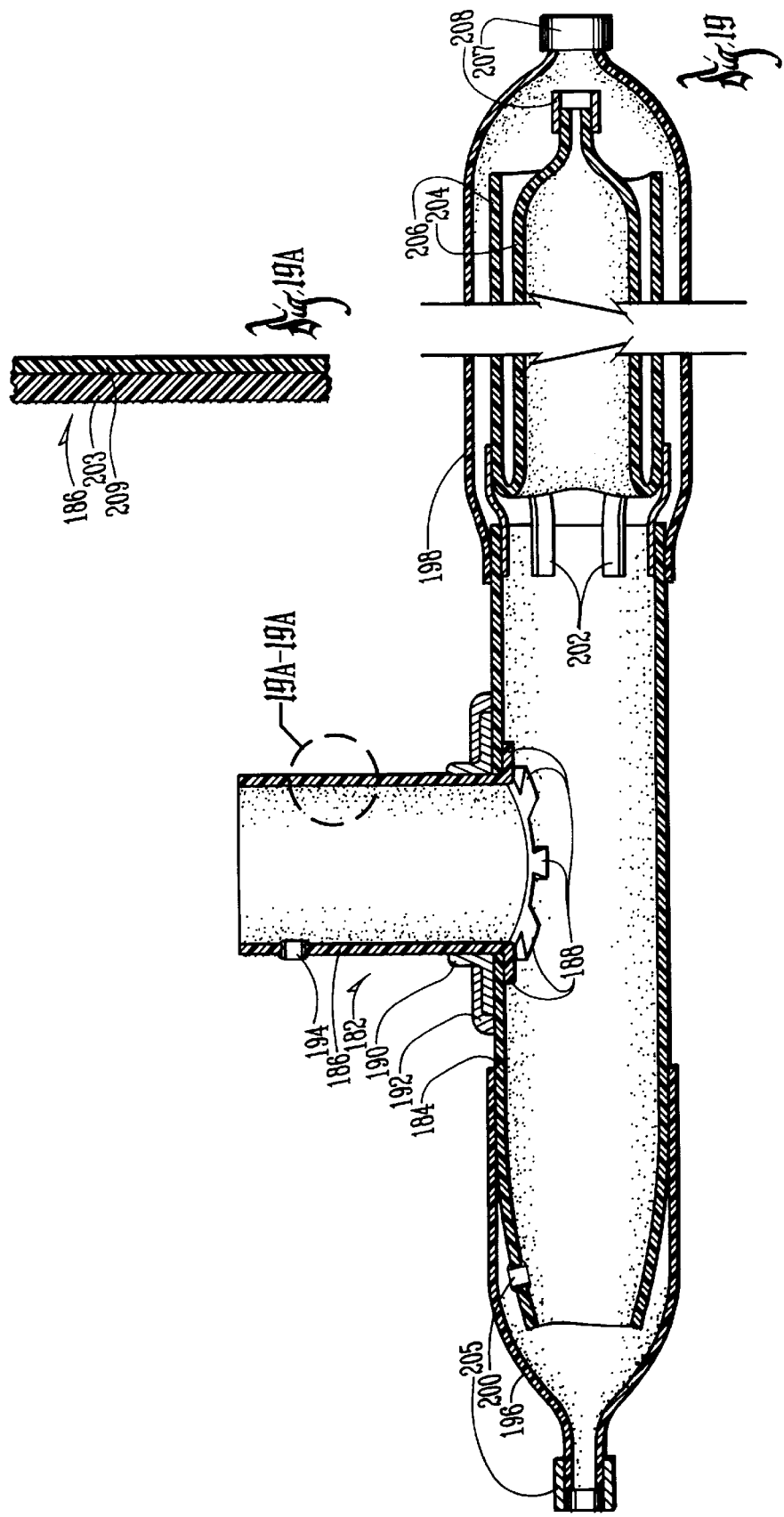

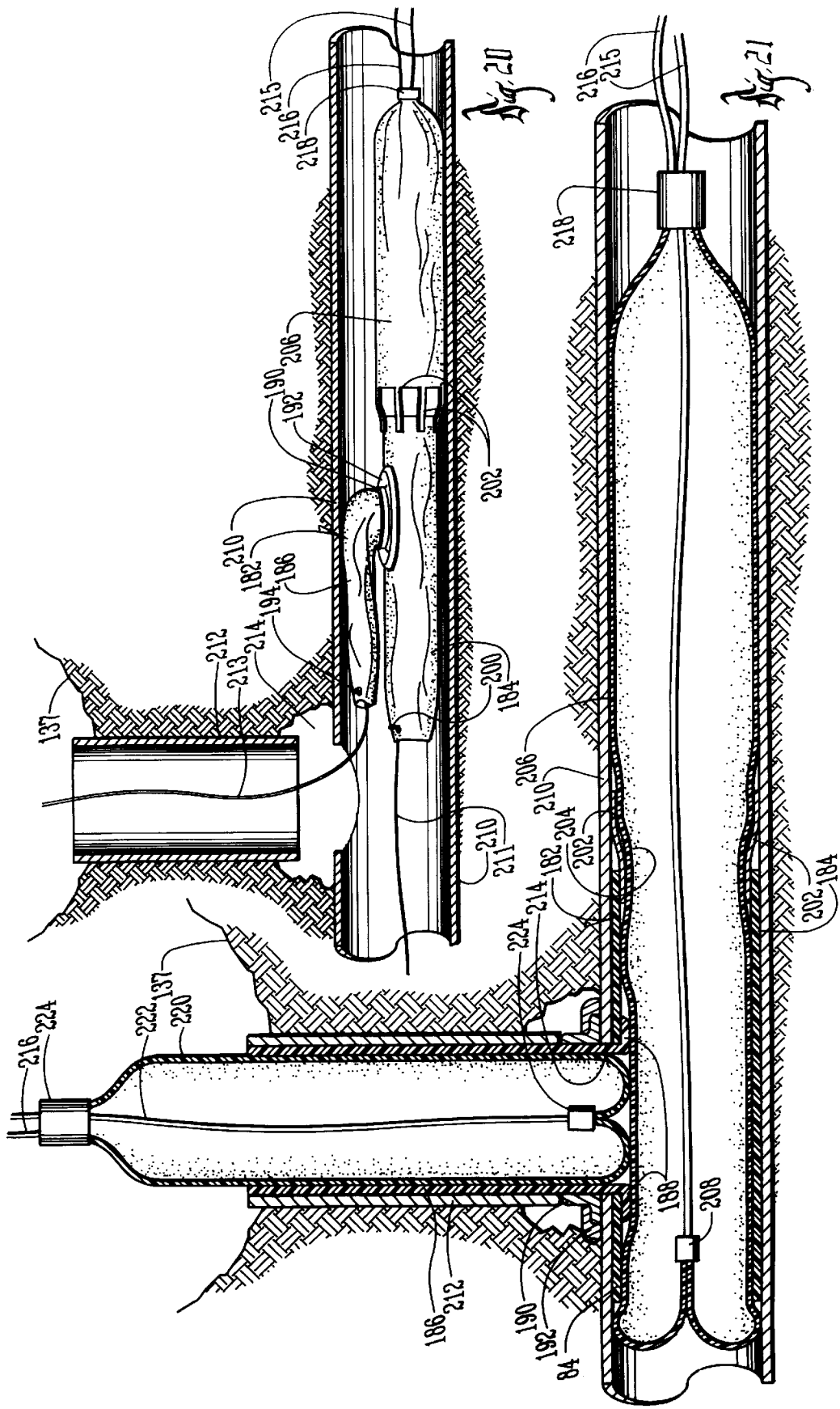

APPARATUS FOR REPAIRING A PIPELINE AND METHOD FOR USING SAME

This is a division of application Ser. No. 08/852,590, filed May 7, 1997 (now U.S. Pat. No. 6,021,815) which is a division of Ser. No. 08/622,817 filed Mar. 27, 1996 (now U.S. Pat. No. 5,765,597), which is a continuation-in-part of Ser. No. 08/293,697 filed Aug. 19, 1994 (now abandoned).

BACKGROUND OF THE INVENTION

This invention relates to apparatus for repairing a pipeline and method for using same.

One method of repairing damaged sewer pipe is to excavate the area surrounding the sewer pipe and replace the broken portion. This is a very expensive and labor intensive solution and is also an inconvenience to residents living in the area and utilizing roadways overlying the area.

Another solution is in situ relining of sewer pipes. In situ methods typically utilize a resin coated liner which is inserted into the existing sewer pipeline and unrolled against the sewer pipe. The unrolled liner is held against the existing sewer pipe while the resin cures to form a new pipe lining within the existing pipe.

One example of such a method is shown in U.S. Pat. No. 4,366,012 dated Dec. 28, 1982. In this patent is shown a process utilizing an elongated outer tube having an inner tube comprised of felt. Uncured resin is introduced into the tube and is used to impregnate the felt inner tube. The two concentric tubes are then inverted into the end of the sewer pipe to be repaired and the inversion process continues until the area of the sewer pipe needing repair has been reached by the inverting tubes. Upon inversion the impregnated felt liner is placed on the outside of the original outer liner, and is pressed against the interior surface of the sewer pipe. When the resin cures a new pipe liner is provided at the area to be repaired.

U.S. Pat. No. 4,366,012 shows a method for impregnating the inner felt tube with uncured resin. The impregnation is initiated by pouring the uncured resin in one end of the two concentric tubes. A slit is made in the outer tube approximately 12 inches from the other end of the outer tube. A vacuum cup is placed over the slit and a vacuum is drawn from the outer tube, thereby causing flattening of the outer tube and assisting the resin to spread through the fabric liner and impregnate it from one end to the other. Once the resin has impregnated the entire felt liner the vacuum is shut off and a patch is solvent welded over the slit.

There are several disadvantages to this impregnation process. The slit makes the outer tube or bladder weaker. Furthermore the cutting of a slit and the patching of a slit are time consuming. If the removal of the vacuum source from the vacuum cup is not timed properly, the vacuum cup will suck up some of the resin, thereby rendering the vacuum equipment inoperable.

Another disadvantage of the method of repairing a sewer pipe shown in U.S. Pat. No. 4,366,012 is that the outer bladder and the inner felt tube must be inverted into the sewer pipe beginning at a manhole located nearest to the area to be repaired. The inverted tubes must then extend to the area to be repaired, thereby requiring a length of tube which will reach from the nearest manhole to the area to be repaired.

For example, if a 300 foot long liner is required, the method of U.S. Pat. No. 4,366,012 requires pouring resin at one end of the tube, moving down the tube for approximately 50 feet, making a slit in the coating of the fabric liner, placing a suction cup over the slit, drawing the resin to that point, removing the vacuum, and placing a patch over the slit. Then it will be necessary to move another 50 feet down the tube and repeat the process. This process will continue at approximately 50 foot intervals until the desired location on the tube is reached.

The foregoing 50 foot intervals are necessary because it is only possible to draw a vacuum so far down the tube and still be effective.

Another disadvantage of the method shown in U.S. Pat. No. 4,366,012 is that the fabric liner is coated. In some applications, it would be desirable to utilize a liner that is not coated and instead use a liner that is separate from the bladder.

Most of the sewer mainlines are usually located in roadways and are buried at a considerable depth. These mainlines have lateral pipes that branch off to houses, businesses and industries. Lateral lines are conduits for carrying waste from these houses, businesses and industries out to the mainline sewer.

Mainline sewers are typically straight with access manholes at spaced apart positions along the length of the main sewer line. Mainline sewers are usually owned by municipalities or utility companies who utilize the services of civil or professional engineers for the design of sewer installations, inspections, and final work acceptances.

Lateral sewers on the other hand are typically installed by local plumbers or home owners. It is common to find numerous bends or fittings in a lateral sewer as well as inappropriate materials used in the original construction. These lateral installations offer a greater challenge in repair than do the reconstruction of the straight and professionally designed mainline sewers.

Therefore, a primary object of the present invention is the provision of an improved apparatus for repairing a pipeline and method for using same.

It is another object of the present invention to provide an apparatus for the insertion and installation of a new liner into an existing pipe which is particularly suitable for the spot repair of damaged sections of a given pipeline, wherein the liner is introduced into the existing pipe by means of a carrier which encloses the liner and protects it from contact with the surrounding pipe walls until the liner is in its desired location within the existing pipe.

It is a further object of the present invention to provide a method for relining pipes in which the pipe liner is secured to an inflation bladder, impregnated with resin and encapsulated within a positioning element, the positioning element then being inserted into an existing pipe and fluid being introduced under pressure into the positioning element to cause the inflation bladder and the liner secured thereto to invert outwardly from within the positioning element to a placement position near the compromised pipe section, the inflation bladder expanding radially in response to fluid pressure and urging the liner into contact against the pipe wall, and subsequently removing the inflation bladder and positioning the element from the pipe.

A further object of the present invention is the provision of an improved method for impregnating a resin absorbent material with an uncured resin while the resin absorbent material is within an inflatable bladder tube.

A further object of the present invention is the provision of an improved method for repairing lateral sewer pipe and particularly for repairing the juncture between the lateral sewer pipe and the mainline sewer pipe.

A further object of the present invention is the provision of an improved carrier which is integral with the bladder tube, and which permits the positioning of the bladder tube within the sewer pipeline in the general area of the pipeline to be needing repair.

A further object of the present invention is the provision of a method for repairing sewer pipeline wherein the outer carrier is disposable after use.

A further object of the present invention is the provision of an improved method and apparatus for repairing pipeline which is economical in manufacture, durable in use, and efficient in operation.

SUMMARY OF THE INVENTION

The foregoing objects may be achieved by an elongated bladder tube having a fill end for receiving a quantity of fluid resin, a vacuum end for connection to a vacuum source, and flexible tube walls forming a tube cavity therein. A layer of resin absorbent material is within the tube cavity and includes first and second material ends. The first material end is spaced a predetermined distance from the vacuum end of the bladder tube. An elongated wick includes an interior wick end positioned between the first and second material ends of the resin absorbent material. The wick extends from its interior wick end toward the vacuum end of the bladder tube and terminates in a vacuum wick end with at least a portion of the wick being located between the vacuum end of the bladder tube and the second material end of the resin absorbent material.

One modified form of the above apparatus involves the use of an elongated carrier which is separate from the bladder tube and which contains the bladder tube and the tube of resin impregnated material so as to protect them during insertion into a sewer pipeline. When the carrier is located adjacent the area in the pipeline to be repaired, the bladder tube is inverted out of the carrier tube and this places the resin impregnated material in contact with the sewer pipe walls needing repair.

Another modified form of the present invention utilizes a carrier which is integral with the bladder tube, and which is folded back on the bladder tube so as to create an outer carrier tube in protective relation over the bladder tube.

The present invention also involves a new method for impregnating a curable resin in a layer of resin absorbent material located within an elongated flexible bladder tube having a fill end and a vacuum end positioned down stream from the fill end. The bladder tube includes tube walls forming a tube cavity therein. The layer of resin absorbent material has a down stream end positioned a predetermined distance from the vacuum end of the bladder tube and an upstream end. An elongated gas conduit having first and second conduit ends is placed within the tube cavity with the first conduit end positioned upstream from the down stream end of the resin absorbent material and with the second conduit end positioned downstream from the downstream end of the resin absorbent material.

The new method involves introducing a quantity of curable resin into the fill end of the bladder tube, the quantity of resin being sufficient to impregnant all of the resin absorbent material within the bladder tube. A vacuum source is then connected to the bladder tube at a point spaced downstream from the downstream end of the resin absorbent material whereby the wall of the bladder tube will collapse on the layer of resin absorbent material and the gas conduit will provide a path for evacuating gas through the collapsed tube walls. Gas is continuously evacuated from the bladder tube until the curable resin moves to the downstream end of the absorbent material and completely impregnates the absorbent material.

While the gas conduit may take a variety of forms without detracting form the invention, the preferred form is an elongated air permeable wick. However, other forms such as tubes, hoses, or other types of conduits may be used for evacuating the air and gas through the collapsed tube walls.

Another aspect of the present invention is the provision of a method for repairing the junction between a lateral sewer pipe and a mainline sewer pipe. The method involves taking a preliner tube (preferably a thermoplastic tube) having first and second ends and being sized to fit within the lateral sewer pipe. The preliner tube includes an open cell gasket extending around the interior surface adjacent one end thereof. The open cell gasket is impregnated with an uncured grout. While different types of grout may be used without detracting from the invention, an example of a preferred grout is a chemical hydrophillic grout manufactured by Thane-Coat Company in Houston, Texas under the product name TC-2400. The preliner tube is then inverted into the lateral sewer pipe to a position wherein the open cell gasket impregnated with grout is now on the exterior of the preliner and positioned at the juncture between the lateral sewer pipe and the main line sewer pipe. The gasket impregnated with grout forms a water tight seal between the preliner tube and the main sewer pipe and the lateral sewer pipe.

Next a flexible sleeve is inserted inside the preliner tube, the sleeve being impregnated with uncured resin. The sleeve may be made of any material capable of absorbing the uncured resin, but a fabric sleeve is preferred. Fluid pressure is applied inside the sleeve to force the sleeve radially outwardly against the preliner until the uncured resin cures and hardens.

The preferred method for placing the preliner tube in the lateral sewer pipe is by the inversion method described above. Similarly the preferred method for inserting the flexible sleeve into the preliner tube is by the inversion method described above.

Another method for repairing a lateral sewer pipe which joins a main sewer pipe at a pipe junction involves taking a preliner assembly comprising a preliner bladder tube and a preliner sleeve within the preliner bladder tube. The preliner sleeve is impregnated with an uncured first material capable of curing and expanding. While different materials may be used, a preferred material is the chemcial hydrophillic grout referred to above. Next the preliner assembly is inverted into the lateral sewer pipe whereby the preliner sleeve will be outside and surrounding the preliner bladder tube. A second liner assembly is formed comprising a second bladder tube and a second sleeve within the second bladder tube. The second sleeve is impregnated with an uncured second material capable of curing and hardening. This second material may vary without detracting from the invention, but it is preferred that a curable resin be used. The second liner assembly is then inverted into the preliner tube whereby the second sleeve will be outside the second bladder tube and the preliner bladder tube will be between the preliner sleeve and the second sleeve. The second preliner tube is expanded radially outwardly so as to hold the second sleeve, the preliner tube, and the preliner sleeve against the lateral sewer pipe. The second sleeve is permitted to cure and harden and then the second bladder tube is removed. The preliner bladder tube forms a moisture impervious layer between the preliner sleeve and the second sleeve. The grout within the preliner sleeve is forced radially outwardly into any open joints, fractures or holes in the host lateral pipe. The grout is activated by water and expands and reinforces the waterproof properties of this system. Once the procedure is complete the liners protruding within the main line are cut off by using a robotic cutter.

Another method for repairing a lateral sewer pipe which joins a main sewer pipe at a pipe junction involves forming a main/lateral liner assembly having an elongated main liner tube and an elongated lateral liner tube. The main liner tube has first and second main liner tube ends and the lateral line tube has a first lateral liner tube end connected to the main liner tube and has a second lateral liner tube end. The main/lateral liner tube assembly is formed from a felt material having a urethane coat or similar material on its outer surface.

The main liner tube is then impregnated and the lateral liner tube is also impregnated with an uncured material capable of curing and hardening. The main/lateral liner assembly is then moved through the main sewer pipe to an operative position with the main liner tube adjacent the pipe junction and with the lateral liner tube extending within the lateral sewer pipe. Next, a lateral bladder tube is inserted into the lateral liner tube and is spread radially outwardly to press the lateral liner tube against the lateral sewer pipe until the uncured material cures and hardens. Then, a main bladder tube is inserted into the main liner tube and is spread radially outwardly to press the main liner tube against the main liner sewer pipe until the uncured material cures and hardens. The lateral and main bladder tubes are then removed leaving the repaired pipe.

BRIEF DESCRIPTION OF THE FIGURES OF THE DRAWINGS

FIG. 1 is a perspective view of a carrier tube having a bladder tube and a repair sleeve mounted therein.

FIG. 2 is a perspective view of the bladder tube having the repair sleeve therein.

FIG. 3 is a perspective view of the bladder tube of FIG. 2 showing the method for inserting the resin into the bladder tube.

FIG. 4 is a sectional view taken along line 4—4 of FIG. 2.

FIG. 5 is a sectional view taken along line 5—5 of FIG. 1.

FIG. 6 is a sectional view taken along line 6—6 of FIG. 1.

FIG. 7 is a perspective view of a modified form of the present invention.

FIG. 8 is a view similar to FIG. 7, but showing the method of applying the resin to the interior of the bladder tube.

FIG. 9 is a sectional view taken along line 9—9 of FIG. 7.

FIG. 10 is a perspective view showing a sewer line to be repaired and showing the carrier tube inserted therein.

FIG. 11 is a sectional view of the sewer pipe showing the manner in which the carrier tube is inserted.

FIG. 12 is a view similar to FIG. 11, and showing the bladder tube partially inverted, FIG. 13 is a sectional view similar to FIG. 12, and showing the bladder tube further inverted.

FIG. 14 is a sectional view similar to FIG. 13 and showing the withdrawing of the bladder tube from the cured repair sleeve.

FIG. 15 is a view similar to FIG. 14 and showing the final removal of the bladder tube and the carrier tube with the repair sleeve in place.

FIG. 16 is a sectional view of a lateral pipeline and a main sewer pipeline, and showing a method for repairing the juncture between the two.

FIG. 17 is a section view showing the manner in which the preliner is mounted into a bladder tube and a carrier tube.

FIG. 18 is a sectional view of a lateral and main sewer pipe junction showing an alternative method for repair.

FIG. 19 is a sectional view of a T-liner assembly which is used in yet another alternative method for repairing a main lateral sewer pipe junction.

FIG. 20 is a sectional view of a main lateral sewer pipe junction, showing one step in the method for using the T-liner assembly of FIG. 19.

FIG. 21 is a sectional view similar to FIG. 20 and showing another step in the method for using the T-liner assembly of FIG. 19.

DETAILED DESCRIPTION OF THE PREFERRED EMBODIMENT

Referring to the drawings the numeral 10 generally designates a repair apparatus of the present invention. Apparatus 10 includes a carrier assembly 12, a bladder assembly 14, and a repair sleeve 16 within the bladder assembly 14. Carrier assembly 12 is comprised of a carrier tube 17 having a rear end 18 and a forward end 19. An end cap 20 is secured to the rear end 18 of carrier tube 17 by means of clamps 22. Extending through the end cap 20 are a bladder control line 24, a fluid injection line 26 and an air escape valve 28 (FIG. 6).

At the forward end of carrier tube 17 is a rigid collar 30 (FIG. 5). A pair of end flaps 32, 34 have their rear ends engaging the collar 30 and clamped to the collar 30 by means of clamp 36. Clamp 36 also holds the forward end 19 of carrier tube 17 against the collar 30. Within the carrier tube is a carrier cavity 38. The attachment of the forward end 19 of the carrier tube 17 to the collar 30 is further facilitated by threads or serrations 40 on the outer surface of collar 30.

The forward ends of end flaps 32, 34 include grommets 42. A pull line 44 is threaded through grommets 42 (FIG. 1) and includes a knot 46 which permits the line 44 to pull the carrier 12 to the left as viewed in FIG. 1. However, when the pull line 44 is pulled to the right, it slips free from the grommets 42.

Bladder assembly 14 is shown in FIG. 2 and includes bladder tube 48 having a rear end 50 and a forward end 52. Fitted within the rear end 50 is a threaded receptacle 54 (FIG. 6) which is held in place in attachment to the rear end 50 by means of clamps 56. A pulling loop 57 is also held by clamps 56 and is attached to bladder control line 24 as shown in FIG. 6.

Referring to FIG. 5, within the bladder tube 48 is repair sleeve 16 formed of felt or other resin absorbent material. The sleeve 16 is attached at its forward end to an inversion collar 62 by means of stitches 60. The forward end of inversion collar 62 is fixedly attached to the forward end 52 of bladder tube 48 by heat sealing, adhesive, or other suitable securing means. The stitches 60 are easily broken away so as to permit the forward end of the repair sleeve 58 to be separated from the rear end of inversion collar 62 by tension forces. A cuff 51 is folded back at forward end 52 of bladder tube 58 and is secured to collar 30 by means of a hose clamp 53.

Referring to FIG. 4, a vacuum coupler 64 includes a threaded end adapted to thread within the threaded receptacle 54 so as to connect a vacuum hose 66 and a vacuum source 68 to the bladder tube 48. A wick 70 includes a forward end 72 located forwardly of the rear end 76 of repair sleeve 58. The wick 70 extends rearwardly therefrom to a rear end 74 located adjacent the threads of threaded receptacle 54.

The method of impregnating the repair sleeve 58 with resin involves pouring the resin into the forward end 52 of bladder tube 48 as illustrated in FIG. 3. A quantity of resin sufficient to impregnate the entire repair sleeve 58 is poured into the bladder tube. A vacuum is applied to the vacuum tube 26 so as to cause the bladder tube 48 to collapse in a flattened state.

The wick 70 provides an important function in this regard since it permits the gas within the bladder tube 48 to be withdrawn even though the bladder tube 48 is collapsed. The felt or other resin absorbent material of repair sleeve 58 permits gas to be withdrawn, but this sleeve does not permit gas to be withdrawn in the area between the rear end 76 of sleeve 58 and the rear end 50 of the bladder tube 48. The wick 70 however, permits the gases to be withdrawn through this particular area. As a result the flattening of the bladder tube 48 causes the resin to be pressed rearwardly from the forward end until it has completely impregnated the felt or other resin absorbent material of repair sleeve 58. Rollers (not shown) may also be applied to the flattened bladder tube 48 to facilitate the spread of resin to all portions of repair sleeve 58. The bladder tube 48 is preferably formed of a transparent or translucent material which permits visual observation of the progress of the resin as it is spread through the repair sleeve 58. By visual inspection it is possible to determine when the resin has spread completely to the rear end 76 of the repair sleeve 58. The vacuum coupler 64 is then withdrawn from the threaded receptacle 54 and a closure cap 38 is threaded in its place. During the removal of the vacuum coupler 64, the wick 70 is grasped and pulled out of the bladder tube 48. The wick 70 will have resin impregnated on its inner end, and can be placed inside the manhole where the repair is taking place as a gauge for determining how long it takes for the resin to cure.

After impregnating the repair sleeve 58, the bladder assembly 14 having the repair sleeve 16 therein is placed inside the carrier tube 17 as shown in FIG. 1.

As shown in FIG. 10, the repair apparatus 10 is then pulled through a sewer line 134 having a area 136 requiring repair. A television camera (not shown) may be placed within the sewer line 134 to show the proper location for the carrier 10 relative to the area 136 needing to be repaired.

When the carrier tube 17 reaches the position shown in FIG. 11, air pressure, water pressure or other fluid pressure is applied to the carrier cavity 38. This causes the bladder tube 48 to begin to invert out of the carrier tube 17 in the manner illustrated in FIG. 12. The inversion of the bladder tube 48 continues until it reaches the position shown in FIG. 13. In this position the repair sleeve 58 is on the outside of the bladder tube 48 and is in engagement with the area 136 of pipe 134 which requires repair. The fluid pressure is continued to be applied to the inverted bladder tube 48, thereby pressing the bladder tube 48 radially outwardly so as to hold the repair sleeve 58 tightly against the area 136.

The resin is permitted to cure and harden. Then the air pressure is released from the carrier tube 17 as shown in FIG. 14 and the bladder control line 24 is pulled to cause the bladder 48 to move to the right and resume its original uninverted configuration within the carrier tube 17. During the withdrawal of the bladder tube 48, the stitches 60 break away as to permit separation of inversion collar 62 from repair sleeve 58, thereby leaving the hardened repair sleeve 58 in place as shown in FIG. 15.

Referring to FIG. 7 a modified form of the present invention is shown and is designated by the numeral 80. Apparatus 80 includes an outer carrier tube 82 having a rear end 84 which surrounds an end cap 86 and is clamped thereto by means of clamps 88. Extending through end cap 86 are a bladder control line 90, a fluid injection line 92, and an air escape valve 94. The outer carrier tube 82 includes a forward end 96 to which is attached by heat sealing or welding a pair of end flaps 98, 100. Flaps 98, 100 are held in place by a spot weld 102 (FIG. 9). A pull cable 104 extends through the grommets 106 in the end flaps 98, 100 and includes a loop 108 on its end.

A release cable 109 has a spring pin 111 on its end. Spring pin 111 is detachably retentively retained in loop 108 so as to attach cable 104 to flaps 98,100. Pulling cable 104 is used to pull the apparatus 80 through the sewer line to the desired location. Then release cable 109 is pulled and spring pin 111 releases from loop 108, thereby permitting cable 104 to slip through grommets 106 and release its attachment from flaps 98,100.

Integrally formed with the outer carrier tube 82 is an inner bladder tube 110 which has a forward end 112 and a rear end 114 adapted to receive a threaded receptacle 116, clamps 118, and a pulling loop 120. A vacuum line 121 is adapted to connected to the receptacle 116 in the same fashion shown and described for the modification in FIG. 2.

The juncture between the outer carrier tube 82 and the inner bladder tube 110 comprises a fold 122 where the carrier tube 82 has been folded back over the bladder tube 110. Initially the bladder tube 110 and the carrier tube 82 are one continuous tube, and the carrier tube 82 is formed by folding it back over the bladder tube 110.

An inversion collar 128 is spot welded or otherwise attached to the forward end 112 of bladder tube 110 and extends rearwardly therefrom. At its rear end it is attached to a repair sleeve 124 by means of threads 126. The repair sleeve is formed of felt or other material which is capable of absorbing an uncured resin. Fiber glass, seamless polyester knit tube, or other materials could be used other than felt or in combination with felt.

Several advantages are obtained by the use of the modified apparatus 80 shown in FIGS. 7–9 over the apparatus 10 shown in FIGS. 1–6. For example, the apparatus 10 utilizes a rigid collar or clamp 36 at the forward end of the carrier tube 12 in order to connect the bladder assembly 14. This rigid collar can in some situations get caught on offset sewer pipe joints during installation or in places where the pipe is partially collapsed, and in those situations the carrier sometimes becomes caught or is unable to pass through the pipe. The rigid collar 36 also adds considerable weight to the repair apparatus whereas the apparatus 80 shown in FIGS. 7–9 is light in weight, weighing about one fourth of what the apparatus 10 weighs.

Another advantage of the apparatus 80 is that it eliminates the step of pulling the bladder assembly 14 into the carrier 12.

The rigid collar 36 used in device 10 must be smaller in diameter than the host sewer pipe. This smaller opening makes it harder for the liner to pass through and requires more pressure than the apparatus 80 which is collapsible and which has a front opening of a size which can be the same as the host pipe. This makes it easier for the apparatus 80 to pass through during inversion and requires less pressure.

The apparatus 10 requires different length and diameter carriers for the various liners installed. This means that the installer must keep an inventory of carriers that are expensive. The installer must also transport more equipment to the job site. The carrier 82 of apparatus 80 is disposable and is designed especially for the liner length and diameter matched to the pipe that is being repaired.

FIG. 8 shows the manner in which the device is filled with resin. The resin is poured into the forward end of bladder tube 110 while bladder tube 110 is located within the outer carrier tube 82. Carrier tube 82 and bladder tube 110 are integral with one another and are preferably formed of a transparent or translucent material which will permit observation of the resin as it is poured into the bladder tube 110. The rear end 84 of the carrier tube 82 is folded forwardly as shown in FIG. 8 so as to expose the rear end of the bladder tube 110 and permit the attachment and detachment of vacuum tube 121. As the vacuum is applied, a roller (not shown) may be used to roll the bladder tube 110 and the carrier tube 82 flat and press the resin rearwardly toward the rearward end of the bladder tube 110. When the fabric liner or repair sleeve 124 of bladder tube 110 is fully impregnated, the vacuum tube 121 is removed and a plug similar to the plug 78 is inserted after removal of the wick 70. The carrier tube 82 is then unfolded at its rear end and it is attached to the end cap 86 in the manner shown in FIG. 7.

Referring to FIGS. 16–18, a lateral pipeline 138 is shown in a T-joint junction with a main pipe line 140. The juncture between the two is indicated by the numeral 142. Commonly the junctures between the lateral pipelines and the main pipelines become damaged or destroyed, and result in ground water infiltrating into the sewer system at the juncture 142.

To repair the lateral pipeline 138, an excavation 137 is made adjacent the lateral pipeline 138 and a small section of lateral pipeline 138 is removed to provide access to the interior of lateral pipeline 138. A tube shaped preliner 148 is formed of a moisture impervious material such as polyurethane, polyvinyl chloride, polyethylene or other similar material. An open cell gasket 150 is fused to the outside of preliner 148 adjacent one end thereof. Gasket 150 is then impregnated with a hydrophillic chemical grout.

Preliner 148 is then inserted into lateral pipe 138 from the excavation 137 by inverting the preliner 148 with air pressure via a launching device such as device 80 shown in FIGS. 7–9. During the inversion process preliner 148 is turned inside out and is positioned along the length of lateral pipe 138 from the excavation 137 to the mainline pipe 140. The gasket 150 is positioned so that it is in contact with the juncture 142 and the area to be repaired.

After the preliner 148 and the open cell gasket 150 are in place, a lateral pipe repair sleeve 156 similar to the repair sleeve 124 of FIG. 9 is inverted into the interior of the preliner 148. This is accomplished by placing a carrier such as carrier 80 (FIG. 9) into the open end of the preliner 148 located within the excavation 137. The carrier 80 is placed in the open end of the preliner 148 and the repair sleeve 156 is inverted into the preliner 148 to the position shown in FIG. 16. Preferably the preliner 148 and the gasket 150 protrude slightly into the hole 146 in the main line 140 so as to permit the hydrophilic grout in the open cell gasket 150 to cure at the damaged juncture 142 and provide a fluid tight seal in the damaged area. The ground water causes activation of the hydrophillic grout and the grout expands and cures to provide this seal. This fluid tight seal provides a sealing between the exterior of the preliner 148 and the interior of the existing pipelines 138, 140 at the juncture 142.

After insertion of the preliner 148, a lateral pipeline repair sleeve 156 is inverted into the interior of the preliner 148 in the manner shown in FIG. 16. This inversion may be accomplished by the methods shown in FIGS. 1–15 above. The positioning of the repair sleeve 156 is such that its lower end protrudes slightly into the hole 146 in the main line 140 located at the juncture 142 between main pipeline 140 and the lateral pipe line 138. During the inversion process air pressure or fluid pressure is used to cause the bladder tube to expand outwardly against the lateral pipe repair sleeve 156 and the preliner 148 so as to cause them to cure and harden in the position shown in FIG. 16. During this process the grout 150 also cures and expands forming a tight seal at the damaged juncture 142.

The foregoing method for and apparatus for repairing lateral pipeline permits numerous lateral pipelines to be reconstructed in one day. The interior pipeliner 156 is a cured in place liner that is inverted through the lateral pipe and will negotiate fittings and bends very easily. It will create a watertight seal at the main line and lateral line connection or juncture, and this particular process is compatible with the other mainline reconstruction methods described with respect to FIGS. 1–15. The method requires a very small excavation in the yard or easement of the home or property from which the lateral pipeline extends. The liner is cured at ambient temperatures and does not require an expensive heating source. The liner is available with a seamless construction design.

After the liners have cured and hardened, the projecting portion 158 is trimmed flush with the inside wall of main pipe line 140 by using a conventional robotic cutter.

Referring to FIG. 18 a modified method for repairing the lateral pipe 138 is shown. The preliner 148 shown in FIG. 16 is a thermal plastic tube. In the method shown in FIG. 18 a fabric preliner 170 is used. The fabric preliner is place within a preliner bladder 172 and is inverted into the lateral pipe 138 in the manner shown in FIG. 18. In this position the fabric preliner 170 is in contact with the interior surface of the lateral pipe 138. Before the inversion process the fabric preliner is impregnated with the uncured grout. After it is inverted into the lateral pipe 138 from the excavation 137, the grout 178 expands into the cracks or loose areas of pipe 138 requiring repair. The preliner bladder 172 is made of a moisture impervious material and is left in place after it has been inverted into the lateral pipe 138.

Next a fabric liner 174 is impregnated with a curable resin within a resin bladder 176. The resin gladder 176 is then inverted into the interior of preliner bladder 172 from the excavation 137 so as to achieve the position shown in FIG. 18 with the resin liner 174 being positioned between the resin bladder 176 and the preliner bladder 172. Air is forced into the interior of the resin bladder 176 so as to urge the fabric preliner 170, preliner bladder 172, and resin liner 174 radially outwardly against the interior of lateral pipe 138. After the grout in preliner 170 activates creating a gel like gasket, the resin in resin liner 174 cures becoming a rigid structural pipe liner. The resin bladder 176 is then removed by pulling on retrieval line 180 and is discarded. This leaves the thermal plastic moisture impervious preliner bladder 172 between the fabric preliner 170 and the resin liner 174 and creates a barrier between the grout and the resin. It also acts as a water proof jacket for the rigid cured pipe. The fabric preliner 170 has pushed the chemical grout into any open joints, fractures or holes in the host lateral pipe 138. The water activated grout expands and reinforces the waterproof properties of this system. Once the procedure is complete the protruding liners are cut off in the main line pipe 140 by using a robotic cutter commonly known in the art.

Another method for repairing both the main line and the lateral in one operation utilizes a T-liner assembly 182 shown in FIGS. 19–21. T-liner assembly 182 includes a main liner sleeve 184 and a lateral liner sleeve 186. These sleeves are formed from a material capable of absorbing uncured resin or grout. An example of such a material is felt, but other materials may be used. The exterior surface of the main liner sleeve 184 and the lateral liner sleeve 186 are coated with urethane or a similar material which will permit them to be protected while being pulled through sewer pipes to their desired position. The urethane coating also provides a moisture impervious barrier. The T-liner assembly 182 is formed by cutting the urethane coated felt to a layflat size required to make a tube approximately 30 inches in length and having a diameter slightly smaller than the interior diameter of the main line host pipe to be repaired. A circular hole is cut in the center of the layflat felt for accommodating the lateral liner sleeve 186.

Then the lateral liner sleeve is formed from a four or a six inch tube made of urethane coated felt. The length is dependent upon the distance from the main line to the excavation 137. On the end of the lateral liner tube 186 which is going to be connected to the mainliner tube 184, approximately one inch of urethane coating is removed from the exterior. The remaining one inch long section is cut into slits so as to form tabs 188 which are inserted into the hole in the main liner tube 184 and are bent back to layflat against the felt. The felt of lateral tube 186 is then heat welded or otherwise adhered to the felt of the main liner tube 184 so as to secure the lateral liner tube 186 to the main liner tube 184 in the manner shown in FIG. 19.

Next a urethane collar 190 is slid down over the lateral liner and is fused to the coating on the lateral liner and the main liner by heat or chemical adhesive. This collar provides for an airtight seal between the two liners 184, 186. A gasket 192 made of absorbent material such as an open cell foam or similar material shaped like a donut is then slid down over the lateral liner until it reaches the junction between the lateral liner tube 186 and the main liner tube 184. This gasket will be impregnated with a hydrophilic chemical grout just prior to installation. The grout gasket will provide for a seal between the liners and the main host pipe, thereby eliminating any ground water from infiltrating into the main line sewer pipe 210. Lateral liner tube 186 is provided with a grommet 194 and main liner tube 184 is provided with a grommet 200.

Attached to one end of the main liner tube 184 is a urethane envelope 196 having an end cap 205 capable of attachment to a vacuum line (not shown) similarly the other end of the main liner tube 184 is provided with a urethane e envelope 198 which also includes an end cap 207 capable of attachment to a vacuum tube. (not shown).

An inversion bladder similar to the inversion bladder shown in FIGS. 7–9 is attached to one end of main line tube 184 by tab strips 202 and is completely enclosed within the urethane envelope 198. The bladder assembly includes a carrier tube 106 and a bladder tube 204 which are integrally formed and which are folded back against one another. An end cap 208 is secured over the interior end of bladder liner 204. Unlike the carrier tube assembly shown in FIGS. 7–9 however, the bladder tube 204 does not include a repair collar mounted on its interior.

Before installation into a sewer pipe to be repaired, a hydrophilic chemical grout is impregnated into the grout ring 192, and an uncured resin is inserted into the upper end of lateral liner sleeve 186. A vacuum is applied first to end tube 205 of urethane envelope 196. This draws the resin inwardly through lateral liner sleeve 186 and through the right-hand portion of the main liner sleeve 184 as viewed in FIG. 19. Next a vacuum is applied to the envelope 198, and resin is drawn into the left-hand portion of main line liner sleeve 184. The end result is that the interior felt surfaces of lateral liner 186 and main line liner 184 are impregnated with the resinous material. When this impregnation is complete the urethane envelopes 196, 198 are snipped off with scissors leaving the remaining assembly of the T-liner assembly 182 and the carrier tube 206 and bladder tube 204.

Referring to FIG. 20, a lateral pull line 213 is attached to the grommet 194 in liner sleeve 186, and a main pull line 211 is attached to the grommet 200 in the lateral liner sleeve 186. Line 213 is threaded through the sewer line 210 and into the excavation 137. Line 211 is threaded through a main sewer line 210 and through a lateral sewer line 212 into an excavation 137. Line 211 is threaded through the main sewer pipe 210 to an adjacent manhole (not shown.

Connected to the end of carrier tube 206 is an end cap 218 having an air line 216 extending therethrough. Also extending through end cap 218 is a retrieval line 215 which is attached to the end cap 208 of bladder tube 204 as shown in FIG. 21.

The lines 211 and 213 are simultaneously pulled to bring the liner tube assembly 182 to the juncture 214 between the main line sewer pipe 210 and the lateral line sewer pipe 212. Continued pulling on the lines 211 and 213 causes the lateral liner sleeve 186 to be pulled upwardly into the lateral sewer pipe 212 in the position shown in FIG. 21.

Next, air pressure is provided to the bladder tube 204 to cause it to invert into the main liner sleeve 184 as shown in FIG. 21. The air pressure holds the main liner tube 184 against the interior of the surface of the main sewer line 210 so that the resin impregnated within the liner sleeve 184 can cure and harden into a cylindrical shape.

Next, another bladder tube assembly is inverted into the lateral liner sleeve 186 from the excavation 137. The bladder tube assembly includes a bladder tube 220 and a retrieval line 222 which extends through an end cap 224. Continued air pressure provided to the bladder tube 220 forces it radially outwardly against the lateral liner sleeve 186 until the resin impregnating the lateral liner tube 186 cures and hardens. It also forces the grout 192 into the cracks and crevices at the juncture between lateral pipe 212 and main line pipe 210 thereby providing a water tight seal to prevent infiltration of ground water into the lateral pipe 212 and the sewer line 210.

After the curing of the grout and the resin within the liner assembly 182, the retrieval lines 215, 216 are pulled to remove the bladder assemblies 204 and 220 from the liner sleeves 184, 186 respectively. The result is a repaired juncture 214 between the lateral line 212 and the main line 210.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A method for repairing the junction between a lateral sewer pipe and a main sewer pipe, said method comprising:

taking a preliner tube having first and second ends and being sized to fit within said lateral sewer pipe, said preliner tube having an open cell gasket extending around the exterior surface of said second end thereof;

impregnating said open cell gasket with an uncured grout;

inserting said preliner tube into said lateral sewer pipe to a position wherein said open cell gasket impregnated with said grout is at said juncture and forms a watertight seal between said preliner tube and said main sewer pipe and said lateral sewer pipe;

inserting a flexible sleeve inside said preliner tube, said sleeve being impregnated with uncured resin;

using fluid pressure from inside said sleeve to force said sleeve radially outwardly against said preliner until said uncured resin cures and hardens.

2. A method for repairing a lateral sewer pipe which joins a main sewer pipe at a pipe junction, said method comprising:

taking a preliner assembly comprising a preliner bladder tube and a preliner sleeve within said preliner bladder tube;

impregnating said preliner sleeve with an uncured first material capable of curing and expanding as a flexible gasket;

inverting said preliner assembly into said lateral sewer pipe whereby said preliner sleeve will be outside and surrounding said preliner bladder tube;

taking a second liner assembly comprising a second bladder tube and a second sleeve within said second bladder tube;

impregnating said second sleeve with an uncured second material capable of curing and hardening;

inverting said second liner assembly into said preliner bladder tube whereby said second sleeve will be outside said second bladder tube and said preliner bladder tube will be between said preliner sleeve and said second sleeve;

expanding said second bladder tube radially outwardly so as to hold said second sleeve, said preliner tube and said preliner sleeve against said lateral sewer pipe;

permitting said first and second materials to cure and harden; and removing said second bladder tube.

3. A method according to claim 1 and further comprising using a grout material as said first material and using a resin material as said second material.

4. A method according to claim 1 and further comprising using a fabric material for said preliner sleeve and using a moisture impervious material for said preliner tube.

5. A method for repairing a lateral sewer pipe which joins a main sewer pipe at a pipe junction, said method comprising:

forming a main/lateral liner assembly having an elongated main liner tube and an elongated lateral liner tube, said main liner tube having first and second main liner tube ends, said lateral liner tube having a first lateral liner tube end connected to said main liner tube and having a second lateral liner tube end;

impregnating said main liner tube and said lateral liner tube with an uncured material capable of curing and hardening;

moving said main/lateral liner assembly through said main sewer pipe to an operative position with said main liner tube adjacent said pipe junction and with said lateral liner tube extending within said lateral sewer pipe;

inserting a lateral bladder tube into said lateral liner tube;

spreading said lateral bladder tube radially outwardly to press said lateral liner tube against said lateral sewer pipe until said uncured material cures and hardens;

inserting a main bladder tube into said main liner tube;

spreading said main bladder tube radially outwardly to press aid main liner tube against said main sewer pipe until said uncured material cures and hardens.

6. A method according to claim 5 wherein said inserting of said lateral bladder tube into said lateral liner tube is accomplished by inverting said lateral bladder tube into said lateral liner tube.

7. A method according to claim 6 wherein said inserting of said main bladder tube into said main lines tube is accomplished by inverting said main bladder tube into said main liner tube.

* * * * *